Oct. 15, 1957 A. L. BECKER 2,809,660
CUSHIONED STREAMLINED CHECK VALVE
Filed April 24, 1956

ALVIN L. BECKER,
INVENTOR.

BY Lynn H. Latta
ATTORNEY.

United States Patent Office 2,809,660
Patented Oct. 15, 1957

2,809,660

CUSHIONED STREAMLINED CHECK VALVE

Alvin Louis Becker, Inglewood, Calif., assignor to Aeroquip Corporation, Jackson, Mich., a corporation of Michigan Application April 24, 1956, Serial No. 580,338

5 Claims. (Cl. 137—514.3)

This invention relates to a check valve embodied in a coupling adapted to be coupled into a fluid line, between tube sections thereof. The general object is to provide a relatively simple check valve of small proportions, especially adapted to be incorporated in a fluid line of tubing in the range of one-half inch, and highly resistant to corrosion, temperature change and high temperatures, while adapted to maintain a good seal in its closed position.

Another object is to provide a check valve composed of a small number of parts.

A further object is to provide a check valve that is highly sensitive to changes in fluid line pressure and adapted to open to any degree required for accommodating any rate of fluid flow between minimum and maximum limits with only slight resistance to flow throughout such range.

Another object is to provide such a check valve wherein the valve throat and movable valve element cooperate to provide a streamlined passage of minimum flow resistance in the wide-open position of the valve.

Other objects will become apparent in the ensuing specifications and appended drawings in which.

Figure 1:
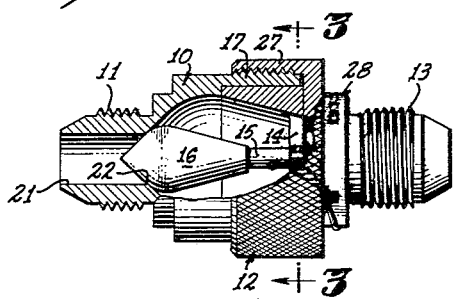
Figure 1 is a side view (partially broken away and shown in section) of a check valve unit embodying the invention.
Figure 2:
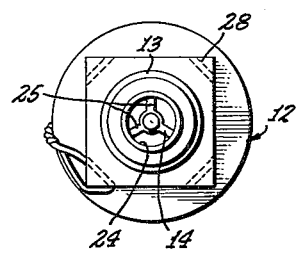
Figure 2 is an end view thereof.
Figure 3:
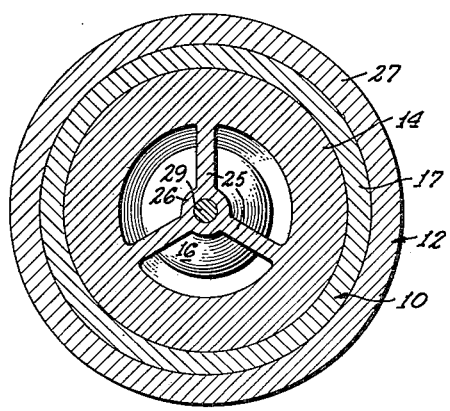
Figure 3 is a transverse sectional view on the line 3—3 of Figure 1.

Referring now to the drawings in detail, I have shown, as an example of one form in which the invention may be embodied, a check valve and coupling unit comprising in general a valve casing 10 having a fitting 11 for coupling to one tube section; a cap 12 having a fitting 13 for coupling to another tube section; a spider 14 secured between cap 12 and valve casing 10; a valve stem 15 mounted in spider 14; and a valve poppet 16 slidably mounted on stem 15. The valve casing 10 and cap 12 are preferably constructed of stainless steel and the valve poppet 16 is preferably of titanium metal, for lightness coupled with corrosion resistance.

Valve casing 10 is generally cylindrical and includes an externally threaded skirt 17 having a cylindrical bore 18 terminating forwardly at an annular shoulder 19 in casing 10. Extending from shoulder 19 is a bell-shaped forward wall 20 which intersects the bore 21 of fitting 11 to define a valve seat 22.

Spider 14 includes an annular rim body having a frusto-conical internal wall 23 which is tangent to the bell wall 20 of casing 10, and cooperates therewith and with valve poppet 16 to define a streamlined passage leading from passage 21 back to a passage 24 extending into fitting 13. Formed integrally with the rim body of spider 14 is a plurality of radial arms 25 which are joined to a hub 26 at the axis of the unit. A series of ports are defined between arms 25, through which the wall 23 extends.

Cap 12 includes a collar portion 27, internally threaded and coupled to the thread of skirt 17, and a back section 28 having an inside frusto-conical wall 35 which defines at the rearward end thereof an annular port 36 or inner end opening of fitting passage 24. The fitting 13 is joined integrally to back section 28. The rim body of spider 14 is clamped between an intermediate wall 37 of the back section 28 and shoulder 19, and the cylindrical outer wall of the rim body is fitted closely in the counterbore 18 of skirt 17, whereby the stem 15 is accurately supported in coaxial relation to the streamlined passage defined by the walls 20, 23 and 35.

Stem 15 is tubular, is open at its forward end, and has a closed rear end terminating in a shank 29 which is press-fitted into a central bore in hub 26 and suitably secured therein, as by riveting its rear end against the rear side of the hub. A shoulder at the rear end of stem 15, at the base of shank 29, seats tightly against the forward face of hub 26 to brace the stem rigidly in its coaxial position.

Figure 4:
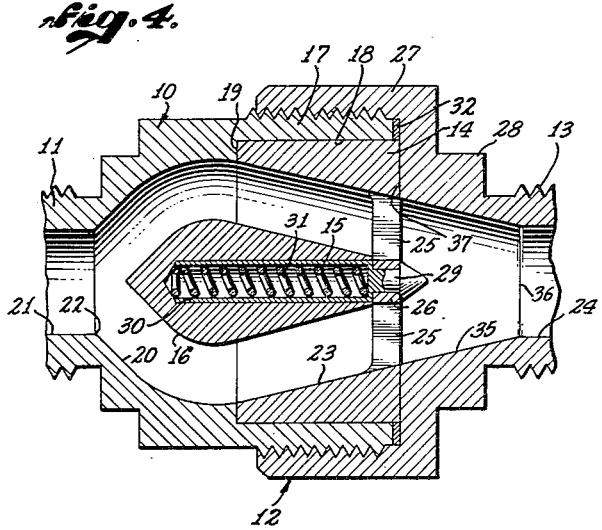
Figure 4 is an enlarged fragmentary sectional view of the valve.

Valve poppet 16 is of tear drop contour in axial section, having a conical nose and a conical tail section, and having an axial bore 30 receiving stem 15 with a smooth sliding fit. A light coil spring 31 is engaged under compression between the poppet 16 at the closed forward end of bore 30 and the stem 15 at its closed rearward end, and yieldingly biases the poppet 16 to a position seating against valve seat 22. Under the pressure of fluid flowing in the fluid line against the forward nose of poppet 16, the poppet will yield rearwardly, compressing spring 31. At maximum open position, shown in Figure 4, an unobstructed annular pear shaped passage is defined between the valve poppet and the walls 20, 23 to allow unimpeded flow through the valve.

A soft copper gasket 32 of flat ring form is interposed between the rear end of skirt 17 and the intermediate wall 36 of back section 28 of the cap 12, providing a seal in the joint between the tube sections that are attached to fittings 13 and 11. Skirt 17 will seat tightly against gasket 32 while slight end clearance exists in the fit of spider 14 between shoulder 19 and back section 28.

A slight radial clearance is provided in the fit of stem 15 in bore 30, so that the air pocketed in the chamber defined between the closed ends of stem 15 and bore 30 may escape slowly from the chamber as the valve opens, and may slowly reenter the chamber as the valve closes, thus providing a dash-pot action which prevents vibration of the valve poppet and chattering on its seat, and causes the poppet to move smoothly to the position determined by the rate of air flow.

Coil spring 31, having a positive rate, offers increasing spring load as it is progressively compressed. As flow rate increases, the fluid pressure head acting on the valve poppet will increase, moving the poppet toward open position until the spring load balances the pressure head. However, the spring, being very light, has a very low spring load throughout the range of compression, and the pressure drop across the valve will increase only slightly in the range of movement from fully closed to fully open position, and will be fairly negligible at all positions.

The clearance between stem and poppet bore is related to the inertia of the poppet so as to dampen vibration and chatter without reducing the sensitivity of the poppet to changes in fluid pressure head thereagainst.

Casing members 10 and 12 are provided with flat sided wrenching portions, in stepped relation between the full diameter portions and the fitting portions of the casing sections, such as to conform generally to the flaring contours of the internal walls of the members.

I claim:

1. In a check valve: a pair of casing members having respective tubular end fittings for connection to respective tube sections and having respective parts for coupling one to the other, said end fittings having inner walls defining respective fluid passages, one of said casing members having a counterbore, an annular shoulder defining an inner end of said counterbore, and a bell shaped wall intersecting its respective fitting passage to define a valve seat and extending rearwardly therefrom to said shoulder, the other casing member having an intermediate wall facing in a direction toward said shoulder and having an inside wall extending from the inside periphery of said intermediate wall to its respective fitting passage; a spider including an annular rim body having a peripheral wall fitted within said counterbore and a frusto-conical inner wall registering at its forward end with the rear end of said bell-shaped wall, tapering inwardly therefrom, and registering at its rear end with the inside wall of the other casing member; said bell shaped throat wall and said frusto-conical wall cooperatively defining a streamlined passage, a hub at the center of the opening defined by the rear end of said frusto-conical wall, spaced radially inwardly therefrom and axially aligned with the fitting passage of said other casing member, and an arm bridging radially between said frusto-conical wall and said hub and integrally joining the hub to said rim body; a tubular stem having a closed rear end provided with a shank mounted in said hub and supporting the stem in coaxial relation to said streamlined passage, and having an open forward end; a valve poppet of tear-drop contour in axial section, having an axial bore, closed at its forward end, loosely receiving said stem so that the poppet is supported for free sliding movement on the stem; and a light coil spring enclosed within said stem and poppet bore and biasing said poppet toward a closed position engaging said seat.

2. A check valve as defined in claim 1, wherein said stem is fitted in said poppet bore with a slight clearance providing for restricted passage of fluid into and out of said poppet bore in response to closing and opening movements of said poppet respectively, at a rate which is related to the inertia of said poppet so as to dampen vibration and chatter therein without reducing the sensitivity of the poppet to changes in fluid pressure head thereagainst.

3. A valve as defined in claim 1, wherein said stem has a diameter matching the diameter of said hub, and wherein said shank is of substantially reduced diameter, a shoulder being thus defined at the rear end of the body of the stem and being abutted against said hub.

4. A valve as defined in claim 1, wherein said coupling parts consist in an externally threaded skirt on said one casing member and an internally threaded collar on said other casing member; said valve further including a flat ring gasket engaged between the end of said skirt and said intermediate wall of said other casing member, said intermediate wall being disposed in a radial plane and the rear end of said rim body being normal to its axis and disposed against said intermediate wall.

5. In a check valve: a pair of casing members having respective tubular end fittings having inner walls defining respective fluid passages for connection to respective tube sections and having respective coupling parts including an externally threaded skirt on one of said casing members and an internally threaded collar on the other casing member, threaded over said skirt, said other casing member having a radial intermediate wall against which the outer end of said threaded skirt is sealed and having an inside wall extending from the inside periphery of said intermediate wall to the fitting passage of said other casing member, the intersection of said inside wall and the fitting passage of said other casing member being an annular port, said externally threaded skirt having a cylindrical counterbore, an annular shoulder at the inner end of the counterbore, a bell shaped wall intersecting its respective fitting passage to define a valve seat, said bell shaped wall extending from said valve seat to said annular shoulder, said radial intermediate wall facing in a direction toward said shoulder; a spider including an annular rim body having a cylindrical peripheral wall fitted within said counterbore and a frusto conical inner wall registering at its forward end with said bell shaped wall at said shoulder, said frusto conical wall tapering inwardly from said shoulder to its rearward end adjacent said radial intermediate wall, said bell shaped wall and said frusto conical wall cooperatively defining a streamlined passage between said valve seat and said annular port, said spider including a hub at its center and a plurality of radial arms joining said hub to said annular rim body; a tubular stem having a closed rear end provided with a shank mounted in said hub and supporting the stem in coaxial relation to said streamlined passage, said tubular stem having an open forward end; a valve poppet of tear drop contour in axial section, having an axial bore, closed at its forward end, loosely receiving said stem so that the poppet is supported for free sliding movement on the stem; and a light coil spring enclosed within said stem and poppet bore and biasing said poppet toward a closed position engaging said seat, said stem being fitted in said bore with a slight clearance providing for restricted passage of fluid into and out of said poppet bore in response to closing and opening movements of said poppet respectively, at a rate which is related to the inertia of said poppet so as to dampen vibration and chatter therein without reducing the sensitivity of the poppet to changes in fluid pressure head thereagainst.

References Cited in the file of this patent

UNITED STATES PATENTS

| 1,802,720 | Junkers | Apr. 28, 1931 |
| 2,102,289 | Smolensky | Dec. 14, 1937 |
| 2,114,921 | Gessner | Apr. 19, 1938 |

FOREIGN PATENTS

| 655,560 | Great Britain | July 25, 1951 |